United States Patent [19]

Ueno et al.

[11] 3,901,868

[45] Aug. 26, 1975

[54] PROCESS FOR PRODUCING BUTADIENE POLYMERS

[75] Inventors: Haruo Ueno, Chiba; Kyohei Oizumi, Ichihara; Hideo Ishikawa, Ichihara; Hisawaki Hamada, Ichihara; Hideyuki Aikawa, Ichihara, all of Japan

[73] Assignee: Ube Industries, Ltd., Japan

[22] Filed: Sept. 20, 1974

[21] Appl. No.: 507,867

[30] Foreign Application Priority Data

Sept. 27, 1973 Japan.............................. 48-107985
Mar. 12, 1974 Japan.............................. 49-27679
Mar. 12, 1974 Japan.............................. 49-27680

[52] U.S. Cl. ...... 260/94.3; 260/94.2 R; 260/94.4 S; 260/94.6 N
[51] Int. Cl.$^2$.... C08D 1/14; C08D 1/34; C08D 3/06
[58] Field of Search .......... 260/94.3, 94.4 S, 94.6 N

[56] References Cited
UNITED STATES PATENTS 3,778,424  12/1973  Shotaro Sugiura et al. ........ 260/94.3

Primary Examiner—Joseph L. Schofer
Assistant Examiner—F. R. Cervi

[57] ABSTRACT

A butadiene polymer consisting essentially of syndiotactic 1,2-polybutadiene is produced by the successive steps of: (A) preparing a catalyst component solution by dissolving, in an inert organic solvent containing 1,3-butadiene, a cobalt compound, soluble in the organic solvent, such as (i) cobalt-$\beta$-diketone complex, (ii) cobalt-$\beta$-keto-acid ester complex, (iii) cobalt salt of organic carboxylic acid and (iv) halogenated cobalt-ligand compound complex, and an organoaluminum commpound, (B) preparing a catalyst composition by mixing the catalyst component solution with an alcohol, ketone or aldehyde compound and carbon disulfide; (C) providing a polymerization mixture containing desired amounts of 1,3-butadiene, the catalyst composition and an inert organic solvent, and (D) polymerizing 1,3-butadiene at a temperature of −20° to 80°C.

46 Claims, 2 Drawing Figures

PROCESS FOR PRODUCING BUTADIENE POLYMERS

The present invention relates to a process for producing a butadiene polymer composed essentially of 1,2-structure, more particularly, relates to a process for producing butadiene polymer composed essentially of 1,2-structure and having a desired melting point.

It is well-known that 1,3-butadiene is converted to a butadiene polymer composed essentially of 1,2-structure by polymerizing it in the presence of a catalyst consisting of a cobalt compound and an organoaluminum compound. However, this process has not yet been successfully utilized in industrial work because of its disadvantages of low yield and the unsatisfactory physical properties of the polymer product.

In order to overcome the disadvantages of the above-mentioned process, a polymerization catalyst comprising a cobalt compound, an organoaluminum and carbon disulfide has been proposed. The proposed polymerization catalyst can convert 1,3-butadiene in an inert organic solvent to syndiotactic 1,2-polybutadiene having a high melting point of approximately 200° to 215°C and a high crystallinity. However, this process is unsatisfactory for industrial purposes because of the relatively low yield of the polymer product. Further, the process can not control the melting point of the polymer product. In order to eliminate these disadvantages, an improvement was proposed. In the improvement, 1,3-butadiene is polymerized in an inert organic solvent in the presence of a catalyst consisting of a cobalt compound, an organoaluminum compound, carbon disulfide and a nitrile compound. One problem in this process is that the nitrile compound which is harmful to the human body is difficult to recover from the polymerization mixture.

The object of the present invention is to provide a process for producing butadiene polymers composed essentially of 1,2-structure and having a desired melting point.

Another object of the present invention is to provide a process for producing butadiene polymers composed essentially of 1,2-structure with a relatively high yield.

The above-mentioned objects are accomplished by the process of the present invention which comprises the steps of:

A. preparing a catalyst component solution by dissolving in an inert organic solvent containing 1,3-butadiene, (a) at least one cobalt compound selected from the group consisting of (i) β-diketone complexes of cobalt, (ii) β-keto-acid ester complexes of cobalt, (iii) cobalt salts of organic carboxylic acids having 6 to 15 carbon atoms, and (iv) complexes of halogenated cobalt compounds of the formula CoXn, wherein X represents a halogen atom and $n$ represents 2 or 3, with an organic compound selected from the group consisting of tertiary amines, alcohols, tertiary phosphines, ketones and N,N-dialkyl-amides, and (b) at least one organoaluminum compound of the formula $AlR_3$, wherein R represents a hydrocarbon radical of 1 to 6 carbon atoms, B. preparing a catalyst composition by mixing said catalyst component solution with (c) at least one organic compound selected from the group consisting of alcohol compounds having 1 to 25 carbon atoms, ketone compounds having 3 to 20 carbon atoms and aldehyde compounds having 1 to 20 carbon atoms and (d) carbon disulfide, C. providing a polymerization mixture containing desired amounts of 1,3-butadiene, said catalyst composition and an inert organic solvent, and D. polymerizing said 1,3-butadiene in said polymerization mixture at a temperature of −20° to 80°C.

The polymer produced by the process of the present invention is composed essentially of syndiotactic 1,2-structure and has a melting point of 70° to 210°C which depends on the composition of the catalyst, especially, the amount of the alcohol, ketone or aldehyde compounds used as a catalyst component. Also, the polymer produced by the process of the present invention can be used to form films, sheets, fibers and other shaped articles, and utilized for producing various graft copolymers by reacting graft monomers with the vinyl radicals in the butadiene polymer. Especially, since the high melting point of butadiene polymer produced by the process of the present invention is valuable for producing plastic shaped articles due to its high resistance to organic solvent, for example, n-hexane and benzene.

The features and advantages of the process of the present invention are more fully described in the following detailed description and the accompanying drawings in which.

In the first step in the process of the present invention, a catalyst component solution is prepared by dissolving at least one cobalt compound and at least one organoaluminum compound in an inert organic solvent containing 1,3-butadiene dissolved therein.

The term "an inert organic solvent" used herein refers to an organic solvent chemically inert to all of the catalyst components used in the process of the present invention, 1,3-butadiene and the butadiene polymer. The inert organic solvent may be selected from the group consisting of aromatic hydrocarbons, aliphatic hydrocarbons, alicyclic hydrocarbons, halogenated aromatic hydrocarbons, halogenated aliphatic hydrocarbons, halogenated alicyclic hydrocarbons, and mixtures of two or more of the above-mentioned compounds. The aromatic hydrocarbons may be benzene, toluene, xylenes, ethyl benzene, diethyl benzene or isobutyl benzene; and aliphatic hydrocarbon may be n-hexane, isohexanes, n-heptane, n-octane, isooctanes, n-decane, 2,2-dimethyl butane, petroleum ether, petroleum benzine, ligroine, kerosene, petroleum spirit or petroleum naphtha, and the alicyclic hydrocarbon may be either cyclohexane or methyl cyclohexane. The halogenated aromatic hydrocarbon may be chlorobenzene, dichlorobenzenes, trichlorobenzenes or chlorotoluenes, and the halogenated aliphatic hydrocarbon may be methylene chloride, chloroform, tetrachloromethane, 1,2-dichloroethane, 1,1,1-trichloroethane, 1,1,2-trichloroethane, tetrachloroethanes, trichloropropane, n-butyl chloride or n-amyl chloride.

The cobalt compound usable for the process of the present invention is soluble in an inert organic solvent selected from the group consisting of i. β-diketone complexes of cobalt,
ii. β-keto-acid ester complexes of cobalt, iii. cobalt salts of organic carboxylic acid having 6 to 15 carbon atoms, and iv. complexes of halogenated cobalt compounds of the formula:

CoXn wherein X represents a halogen atom and n represents 2 or 3, with an organic compound selected from the group consisting of tertiary amines, alcohols, tertiary phosphines, ketones and N,N-dialkyl-amides.

The β-diketone compound to form a complex with a cobalt atom is of the formula:

wherein $R^1$ and $R^4$, which are the same as or different from one another, are an alkyl radical of 1 to 6 carbon atoms and $R^2$ and $R^3$, which are the same as or different from one another, are a hydrogen atom or an alkyl radical having 1 to 6 carbon atoms. Such type of β-diketone complex of cobalt may be cobalt (II) acetylacetonate or cobalt (III) acetylacetonate.

The β-keto-acid ester to form a complex with a cobalt atom may be of the formula:

wherein $R^1$, $R^2$, $R^3$ and $R^4$ are the same as defined above. Such type of the cobalt complex may be a cobalt-acetoacetic acid ethyl ester complex.

The cobalt salt of organic carboxylic acid may be either cobalt octoate or cobalt naphthenate.

In the ligand compounds capable of forming a complex with a halogenated cobalt compound, the tertiary amine may be pyridine, triethylamine, tributylamine or dimethylaniline, the alcohol may be methyl alcohol or ethyl alcohol, the tertiary phosphine may be trimethyl phosphine, tributyl phosphine or triphenyl phosphine, the ketone may be acetone or methyl ethyl ketone and N,N-dialkylamide may be N,N-dimethylformamide, N,N-dimethyl acetamide, N,N-diethyl formamide or N,N-diethyl acetamide. The complex of halogenated cobalt is preferably either a complex of cobalt chloride with pyridine or ethyl alcohol.

The organoaluminum compound usable for the process of the present invention is of the formula $AlR_3$, wherein R represents a hydrocarbon radical of 1 to 6 carbon atoms. The hydrocarbon radical may be an alkyl, cycloalkyl, or aryl radical of 1 to 6 carbon atoms. Preferably, the organo-aluminum compound may be trimethylaluminum, triethylaluminum or triphenylaluminum.

In the preparation of the catalyst component solution, it is important that the cobalt compound and the organo-aluminum compound are dissolved in the inert organic solvent containing 1,3-butadiene. If the preparation is carried out in the absence of 1,3-butadiene, the resultant catalyst component solution is not effective as a component of the catalyst composition of the present invention. The 1,3-butadiene is preferably used in a ratio by mole of at least 1.0, more preferably, at least 5.0, to the amount by mole of the cobalt compound to be used in the catalyst component solution.

Generally, the larger the ratio of the amount of 1,3-butadiene to the cobalt compound in the catalyst component solution, the higher the activity of the catalyst composition prepared from the catalyst component solution. However, the activity of the catalyst composition reaches an equilibrium value between 10 to 200 of the ratio by mole of the amount of 1,3-butadiene to the cobalt compound in the catalyst component solution. That is, if the 1,3-butadiene is used in a large ratio, for example, 1,000 to 200,000, by mole to the cobalt compound, the activity of the catalyst composition is similar to that of the catalyst composition prepared from the catalyst component solution containing 1,3-butadiene in a ratio of 10 – 200, by mole. If the ratio is less than 1.0, the resultant catalyst composition has poor activity, in that the catalyst composition cannot be used industrially. The catalyst component solution may contain either all or a portion of the amount of 1,3-butadiene to be polymerized in the polymerization mixture. The catalyst component solution is preferably prepared at a temperature of 10° to 50°C and preferably contains 0.0005 to 1.0% by mole, more preferably, 0.001 to 0.5% by mole, of the cobalt compound, 0.001 to 10% by mole, more preferably, 0.03 to 5% by mole, of the organoaluminum compound based on the amount by mole of 1,3-butadiene to be polymerized. The ratio of the amount of mole of the organoaluminum compound to that of the cobalt compound is preferably in a range from 0.1 to 500, more preferably, from 0.5 to 100.

It is well-known that the organoaluminum compound should be prevented from contact with water which may decompose the organoaluminum compound. Accordingly, it is preferable that the inert organic solvent to be used to prepare the catalyst component solution is preliminarily dehydrated at least up to a content of water which is insufficient to completely decompose the entire amount of the organoaluminum compound.

In the preparation of the catalyst component solution, it is preferable that the cobalt compound is firstly dissolved in the inert organic solvent in the presence of 1,3-butadiene and the organoaluminum compound is secondly dissolved in the above solution.

Figure 1:
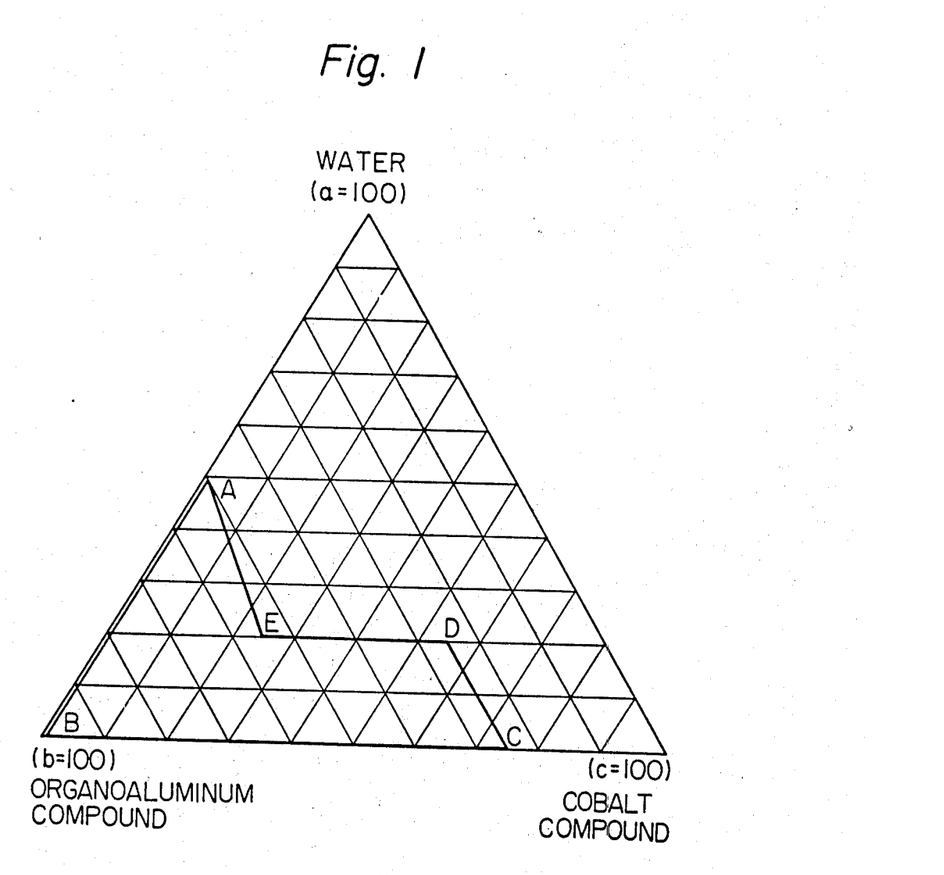
FIG. 1 shows the proportions of water, organoaluminum compound and cobalt compound in the catalyst component solution, in a triangular coordinate system.

However, if the catalyst component solution is prepared by firstly dissolving the organoaluminum compound in the inert organic solvent containing the 1,3-butadiene and secondly dissolving the cobalt compound in the above-prepared solution, it is preferable that the proportion of the water, the organoaluminum compound and the cobalt compound is in the range detailed below. Provided that in the catalyst component solution, the water, the organoaluminum compound and the cobalt compound in a ratio by mole percentage of $a:b:c$, the proportion $a$, $b$, $c$ is on or within a figure defined, in a triangular coordinate system having three ordinates respectively presenting the mole percentages of the water, organoaluminum compound and cobalt compound, by coordinate A ($a = 49.8$, $b = 50$ and $c = 0.2$), B ($a = 0$, $b = 99.8$ and $c = 0.2$), C ($a = 0$, $b = 25$ and $c = 75$), D ($a = 20$, $b = 25$ and $c = 55$) and E ($a = 20$, $b = 55$ and $c = 25$).

FIG. 1 shows the above-mentioned figure ABCDE in the triangular coordinate system.

It is preferable that the catalyst component solution be prepared using a dehydrated inert organic solvent. The inert organic solvent may contain therein either no water or at most 500 p.p.m., preferably, at most 200 p.p.m. of water. If the content of water in the inert organic solvent is larger than 500 p.p.m., the catalyst component solution has to contain a relatively large amount of the cobalt compound and organoaluminum compound. This results in an economic disadvantage.

In the process of the present invention, it is desirable that the catalyst component solution is maintained for at least 30 seconds, more preferably, at least 1 minute and, thereafter, subjected to the preparation of the catalyst composition.

In order to prepare a catalyst composition, the catalyst component solution is mixed with at least one organic compound selected from the group consisting of alcohol compound having 1 to 25 carbon atoms, ketone compounds having 3 to 20 carbon atoms and aldehyde compounds having 1 to 20 carbon atoms and carbon disulfide. The preparation of the catalyst composition is preferably carried out at a temperature of 10° to 50°C.

The above-mentioned alcohol compound usable for the present invention is selected from the group consisting of monohydric alcohols, polyhydric alcohols and polyhydric alcohol derivatives having at least one hydroxyl radical, which have 1 to 25 carbon atoms. The monohydric alcohol is selected from the group consisting of saturated aliphatic alcohols, unsaturated aliphatic alcohols, alicyclic alcohols, aromatic alcohols and heterocyclic alcohols.

The saturated aliphatic alcohol may be methyl alcohol, ethyl alcohol, n-propyl alcohol, isopropyl alcohol, n-butyl alcohol, sec-butyl alcohol, tert-butyl alcohol, isobutyl alcohol, n-amyl alcohol, isoamyl alcohol, sec-amyl alcohol, tert-amyl alcohol, n-hexyl alcohol, 2-ethylbutyl alcohol, n-heptyl alcohol, 2-heptyl alcohol, n-octyl alcohol, 2-octyl alcohol, 2-ethylhexyl alcohol, capryl alcohol, nonyl alcohol, n-decyl alcohol, lauryl alcohol or 4-methylpentanol-2.

The unsaturated aliphatic alcohol may be allyl alcohol, crotyl alcohol or propargyl alcohol. The alicyclic alcohol may be cyclopentanol, cyclohexanol, 2-methylcyclohexanol or α-terpineol. The aromatic alcohol may be benzyl alcohol, cinnamyl alcohol and triphenyl carbinol. The heterocyclic alcohol may be either furfuryl alcohol or tetrahydrofurfuryl alcohol.

The polyhydric alcohol usable for the present invention may be selected from ethylene glycol, propylene glycol, 1,3-butane diol, 1,5-pentane diol, 1,6-hexane diol, 1,10-decane diol, glycerin, 1,1,1-trishydroxypropane, 1,2,6-hexane triol, pentaerythritol and trimethylol propane.

The polyhydric alcohol derivative having at least one hydroxyl radical usable for the present invention may be selected from the group consisting of ethylene glycol monoalkyl ether, diethylene glycol, diethylene glycol monoalkyl ether triethylene glycol, triethylene glycol monoalkyl ether, propylene glycol monoalkyl ether and diacetone alcohol. In the above-mentioned derivatives, the monoalkyl groups may have 1 to 6 carbon atoms.

The ketone compound having 3 to 20 carbon atoms usable for the present invention may be selected from the group consisting of aliphatic ketones, for example, acetone, acetylacetone, ethylmethyl ketone, methylpropylketone, isopropylmethyl ketone, butylmethylketone, iso-butylmethyl ketone, pinacolone, diethyl ketone, butyrone, di-isopropyl ketone and di-isobutyl ketone; alicylic ketones, for example, cyclobutanone, cyclopentanone, cyclohexanone and cyclododecanone; aromatic ketones, for example, acetophenone, propiophenone, butylophenone, valerophenone, benzophenone, dibenzyl ketone and 2-aceto-haphthone, and heterocyclic ketones, for instance, 3-acetothienone and 2-acetofuron.

The aldehyde compound having 1 to 20 carbon atoms usable for the present invention may be selected from the group consisting of aliphatic aldehydes, for example, formaldehyde, acetaldehyde, propionaldehyde, n-butyl aldehyde, isobutyl aldehyde, n-valeraldehyde, isovaleraldehyde, pivalic aldehyde, caproic aldehyde, heptaldehyde, caprylic aldehyde, pelargon aldehyde, capric aldehyde, undecyl aldehyde, lauric aldehyde, tridecyl aldehyde, mystic aldehyde, pentadecyl aldehyde, palmitic aldehyde and stearic aldehyde; aliphatic dialdehydes, for example, glyoxal and succindialdehyde; aromatic aldehyde, for example, benzaldehyde, o-, m- and p-tolualdehydes, salicyl aldehyde, α- and β- naphthoaldehydes and o-, m- and p-anisaldehydes, and; heterocyclic aldehydes, for example, frufural.

The alcohol, ketone or aldehyde compound mentioned above is preferably used in a proportion of 0.5 to 5000%, more preferably, 1 to 1000%, by mole, based on the amount by mole of 1,3-butadiene to be polymerized in the polymerization mixture. The physical properties, particularly, the melting point, of the polymer product can be varied in response to the proportion of the alcohol, ketone or aldehyde compound in the polymerization mixture.

Also, it is preferable that the alcohol, ketone or aldehyde compound is used at a ratio by mole of 2 to 25,000, more preferably, 10 to 5,000, to the amount by mole of the organoaluminum compound in the catalyst composition.

The carbon disulfide is preferably contained in a proportion of 0.0005 – 2% by mole, more preferably, 0.001 to 1% by mole, based on the amount by mole of the 1,3-butadiene to be polymerized in the polymerization mixture.

In the process of the present invention, the larger the proportion of the carbon disulfide in a range from about 0.0005 to about 0.5% by mole based on the amount by mole of the 1,3-butadiene to be polymerized in the polymerization mixture, the larger the yield of the polymer product obtained from the polymerization mixture. However, too large an amount of carbon disulfide, for example, larger than 0.5% by mole, causes a decrease of the polymer product yield. In the process of the present invention, an increase of the proportion of the amount of alcohol, ketone or aldehyde to that of 1,3-butadiene to be polymerized in the polymerization mixture causes a decrease of the melting point of the butadiene polymer produced from the above polymerization mixture.

Also, in the range from about 0.5% to about 200% by mole of the alcohol, ketone or aldehyde compound based on the amount by mole of the 1,3-butadiene to be polymerized, the larger the proportion of the alcohol, ketone or aldehyde compound, the larger the polymer product yield. However, in the proportion larger than about 200% by mole, the larger the proportion of the alcohol, ketone or aldehyde compound, the lower the yield of the polymer product. Accordingly, it is possible to obtain a polymer product having a desired melting point between about 70° to about 210°C by adjusting the proportion of the alcohol, ketone or aldehyde compound based on the amount by mole of the 1,3-butadiene to be polymerized in the polymerization mixture.

It is known that in the conventional process for producing butadiene polymer by polymerizing 1,3-butadiene in the presence of a catalyst prepared from a cobalt compound and an organoaluminum compound, the addition of an alcohol ketone or aldehyde to the polymerization mixture results in deactivation of the catalyst. Accordingly, the alcohol ketone or aldehyde compound is utilized as a polymerization-stopper for the above-mentioned conventional process. However, in the process of the present invention, the alcohol, ketone or aldehyde does not act as the polymerization stopper. Sometimes, the addition of the alcohol, ketone or aldehyde can result in enhancement of the activity of the catalyst composition and, therefore, in an increase of polymer product yield. Further, it should be noted that the melting point of the polymer product can be controlled by adjusting the proportion of the alcohol, ketone or aldehyde compound to the 1,3-butadiene in the polymerization mixture. Such effect of the alcohol, ketone or aldehyde compound in the process of the present invention can not be anticipated from the conventional methods.

In the preparation of the catalyst composition, the alcohol, ketone or aldehyde compound and the carbon disulfide to be mixed with the catalyst component solution may contain either no or a small amount of water. In the case where the catalyst composition contains water, the total amount of water is preferably in a ratio by mole of 0.01 to 10000 to the amount by mole of the cobalt compound in the catalyst composition.

In the process of the present invention, the polymerization mixture is prepared using the catalyst composition by any of the following methods.

Method 1

1. A catalyst component solution is prepared by dissolving a portion of a desired amount of 1,3-butadiene to be polymerized in an inert organic solvent, and then, dissolving a cobalt compound and an organoaluminum compound in the above solution.

2. An alcohol, ketone or aldehyde compound and carbon disulfide are mixed with the catalyst component solution to prepare a catalyst composition.

3. The balance of the desired amount of 1,3-butadiene is dissolved in an inert organic solvent and the solution is mixed to the catalyst composition to prepare a polymerization mixture in which the desired amount of 1,3-butadiene to be polymerized is contained.

Method 2

1. A catalyst component solution is prepared by dissolving a portion of a desired amount of 1,3-butadiene to be polymerized in an inert organic solvent and further dissolving a cobalt compound and an organoaluminum compound in the above solution.

2. In order to prepare a polymerization mixture, the catalyst component solution, an alcohol, ketone or aldehyde compound and carbon disulfide are admixed, in an optional order, to a solution of the balance of the desired amount of 1,3-butadiene in an inert organic solvent.

Method 3

1. In order to prepare a catalyst component solution, the entire amount of 1,3-butadiene to be polymerized is dissolved in an inert organic solvent, and a cobalt compound and an organoaluminum compound are dissolved in the solution.

2. A polymerization mixture is prepared by admixing an alcohol, ketone or aldehyde compound and carbon disulfide to the catalyst component solution.

If the catalyst compostion contains the entire amount of 1,3-butadiene to be polymerized and the entire amount of the inert organic solvent to be present in the polymerization mixture, that is, in Method 3, the catalyst composition is used as the polymerization mixture without addition. However, when the catalyst composition contains only a portion of the desired amount of 1,3-butadiene to be polymerized and a portion of the desired amount of the inert organic solvent to be present in the polymerization mixture, the necessary amounts of the 1,3-butadiene and the inert organic solvent are mixed with the catalyst composition to prepare the polymerization mixture. The 1,3-butadiene to be polymerized is preferably in an amount of 2 to 30% based on the weight of the inert organic solvent in the polymerization mixture. The type of the additional inert organic solvent to be added to the polymerization mixture may be either the same as or different from that in the catalyst component solution. Usually, the additional inert organic solvent is preferably the same as the inert organic solvent in the catalyst component solution.

The polymerization of 1,3-butadiene is carried out at a temperature of $-20°$ to $80°C$, preferably, $5°$ to $50°C$. The polymerization may be effected either under a normal pressure or a pressurized pressure.

Figure 2:
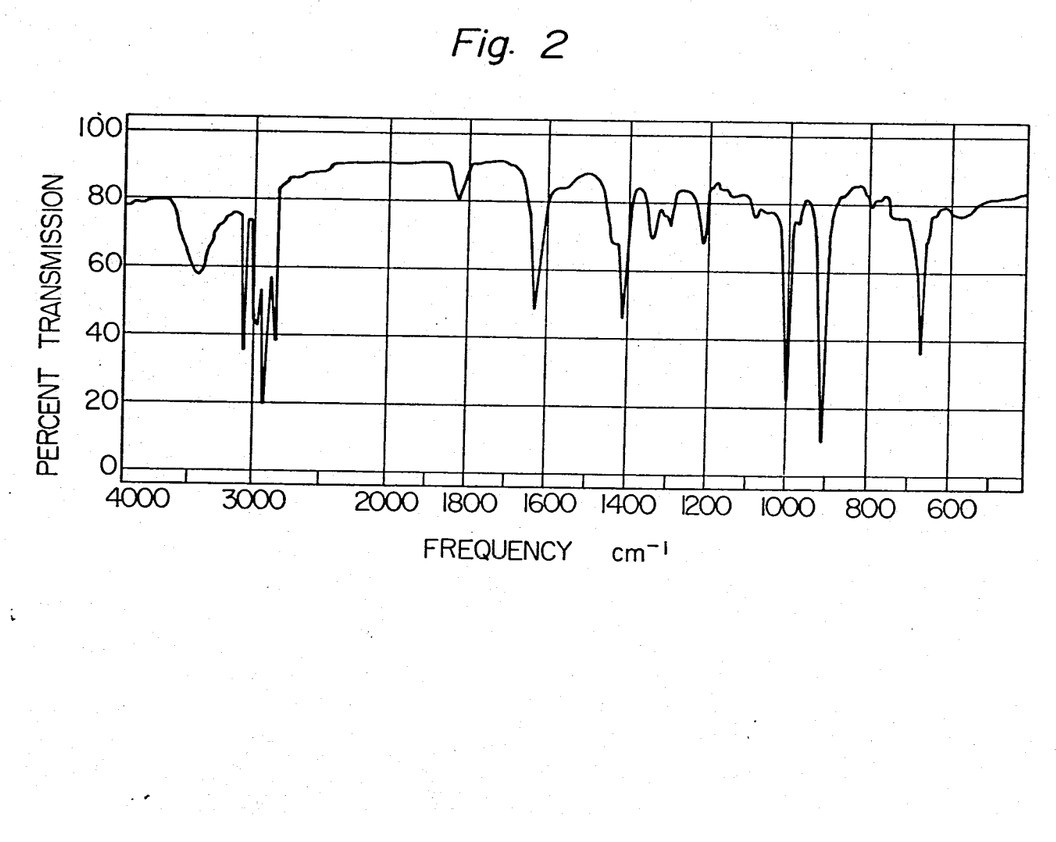
FIG. 2 shows an infrared absorption spectrum of a polymer product prepared by the process of the present invention.

The polymer product produced by the process of the present invention is composed essentially, that is, 80% by weight or more, of sindiotactic 1,2-structure. Referring to FIG. 2, the infrared absorption spectrum of a polymer product of the present invention has a remarkable absorption at $660$ $cm^{-1}$. The absorption is characteristic to syndiotactic 1,2-structure. As stated hereinbefore, the process of the present invention can produce the polymer product having a desired melting point by varying the concentration of the alcohol, ketone or aldehyde compound in the catalyst composition. Generally, the lower the melting point of the polymer product, the higher the solubility of the polymer product in an organic solvent, for example, hot benzene. For example, the polymer product having a melting point of $189°C$ has a small solubility of less than 10% in hot benzene of $80°C$. Compared with this, another polymer product having a melting point of $155°C$ can be completely dissolved in hot benzene at $80°C$.

Various embodiments of the process of the present invention in practice are illustrated by the following working examples. These examples are intended merely to illustrate the present invention and not in any sense to limit the scope in which the present invention can be practiced.

In the following examples, the content of 1,2-structure in the polymer product was determined by the measurement of nuclear magnetic resonance (NMR) using a normal method, the melting point of the polymer product was indicated by a peak temperature of a heat absorption curve drawn by a differential scanning calorimeter (DSC), and the reduced specific viscosity of the polymer product was measured in a tetrahydronaphthalene solution containing the 0.15 g/100 ml of the polymer product at a temperature of $135°C$, and indicated in the unit of $\eta sp/°C$.

EXAMPLES 1 THROUGH 11 AND COMPARISON EXAMPLE 1

In each example, a polymerization mixture was prepared by the following operations.

A glass separable flask having a capacity of 2000 ml was subjected to the replacement of its inside atmospheric air by nitrogen gas and, then, received 760 ml of dehydrated benzene containing 1.0 millimole of water and 74 g of 1,3-butadiene dissolved therein. The benzene solution was mixed with 1 millimole of cobalt octoate which was in the state of a benzene solution containing 0.1 millimoles/ml of the cobalt octoate. One minute after the above mixing, 2 millimoles of triethylaluminum in the state of a benzene solution containing 1 millimole/ml of the triethylaluminum was added to the mixture and the mixture was stirred for 1 minute to prepare a catalyst component solution. Thereafter, methyl alcohol in an amount indicated in Table 1 was added to the catalyst component solution and 1 minute after the above addition, 0.6 millimoles of carbon disulfide, in the state of a benzene solution containing 0.3 millimoles/ml of the carbon disulfide, was mixed with the mixture. The resultant polymerization mixture was stirred at a temperature of 30°C for 60 minutes to polymerize the 1,3-butadiene.

In order to separate and precipitate the polymer product, the polymerization mixture was added to 1000 ml of a methyl alcohol solution containing 0.74 g of phenyl-β-naphthylamine and 7.5 g of an aqueous solution containing 30% by weight of sulfuric acid. The polymer product thus precipitated was washed with methyl alcohol and dried at room temperature. The dried polymer product was entirely in the form of powder. Table 1 shows the yield, reduced specific viscosity and the melting point of the polymer product as well as the content of 1,2-structure in the polymer product. The microstructure of the polymer product in Example 5 was determined by infrared absorption spectrum analysis using a KBr tablet method. The infrared absorption spectrum of the polymer product is indicated in FIG. 2. It was observed that the spectrum includes a remarkable absorption peak at 660 $cm^{-1}$, which is characteristic of syndiotactic 1,2-structure.

In Comparison Example 1, the same procedures as in Example 1 were repeated except that no methylalcohol was used. The results are indicated in Table 1.

Table 1

| Item | Polymerization mixture Amount of methyl alcohol (millimole) | Polymer product Yield (%) | Content of 1,2-structure (%) | Melting point (°C) | Reduced specific viscosity (η sp/°C) |
|---|---|---|---|---|---|
| Comparison Example 1 | 0 | 63 | 99 | 195 | 0.95 |
| Example 1 | 10 | 72 | 99.2 | 192 | 0.96 |
| 2 | 40 | 75 | 98.0 | 189 | 0.94 |
| 3 | 120 | 78 | 97.0 | 183 | 0.76 |
| 4 | 300 | 85 | 95.4 | 173 | 0.82 |
| 5 | 500 | 97 | 93.6 | 155 | 0.78 |
| 6 | 700 | 82 | 92.6 | 146 | 0.80 |
| 7 | 1000 | 100 | 89.4 | 127 | 0.91 |
| 8 | 1500 | 100 | 88.5 | 123 | 0.82 |
| 9 | 2500 | 82 | 86.9 | 115 | 0.99 |
| 10 | 5000 | 50 | 85.5 | 110 | 1.06 |
| 11 | 10000 | 16 | 84.7 | 107 | 1.05 |

EXAMPLES 12 THROUGH 41

In each example, the same operations as in Example 5 were repeated except that the type of alcohol as indicated in Table 2 was used instead of methyl alcohol. The properties and yields of the polymer products are indicated in Table 2.

Table 2

| Item Example No. | Polymerization Mixture Type of alcohol | Polymer product Yield (%) | Content of 1,2-structure (%) | Melting point (°C) | Reduced specific viscosity (η sp/°C) |
|---|---|---|---|---|---|
| 12 | Ethyl alcohol | 73 | 91.3 | 170 | 0.93 |
| 13 | n-Propyl alcohol | 90 | 96.0 | 174 | |
| 14 | n-Butyl alcohol | 57 | 91.5 | 175 | 1.02 |
| 15 | sec-Butyl alcohol | 67 | 97.2 | 184 | 0.96 |
| 16 | iso-Butyl alcohol | 38 | 97.1 | 179 | 0.96 |
| 17 | Allyl alcohol | 77 | 97.6 | 180 | |
| 18 | Furfuryl alcohol | 52 | 97.2 | 187 | |
| 19 | n-Amyl alcohol | 79 | 95.5 | 174 | 0.89 |
| 20 | sec-Amyl alcohol | 52 | 99.0 | 179 | 1.03 |
| 21 | iso-Amyl alcohol | 75 | 92.0 | 167 | |
| 22 | Glycerin | 65 | 98.0 | 189 | 0.89 |
| 23 | Ethylene glycol | 57 | 97.8 | 188 | 1.10 |
| 24 | Triethylene glycol | 89 | 90.2 | 165 | |
| 25 | Propylene glycol | 73 | 91.2 | 184 | 0.89 |
| 26 | 1,3-Butane-diol | 87 | 91.8 | 165 | 0.97 |
| 27 | 1,6-Hexane-diol | 83 | 98.4 | 183 | 0.82 |
| 28 | 1,10-Decane-diol | 51 | 95.4 | 185 | 0.63 |
| 29 | Ethylene glycol mono-n-butyl ether | 100 | 95.7 | 158 | 0.80 |
| 30 | Ethylene glycol monoethyl ether | 72 | 96.0 | 161 | |
| 31 | 1,1,1-tris-hydroxypropane | 44 | 96.7 | 186 | |
| 32 | 1,2,6-hexane-triol | 48 | 98.5 | 189 | |
| 33 | Benzyl alcohol | 88 | 96.6 | 177 | 0.85 |
| 34 | Triphenyl Carbinol | 50 | 94.3 | 159 | |
| 35 | n-Hexanol | 55 | 93.5 | 175 | |
| 36 | 2-Ethylbutyl alcohol | 64 | 94.3 | 176 | |
| 37 | n-Heptyl alcohol | 51 | 95.2 | 177 | |
| 38 | 2-Octyl alcohol | 79 | 95.7 | 185 | |
| 39 | 2-Ethylhexyl alcohol | 75 | 94.4 | 178 | |
| 40 | n-Decyl alcohol | 51 | 98.0 | 175 | |
| 41 | Lauryl alcohol | 59 | 95.6 | 169 | |

EXAMPLE 42 AND COMPARISON EXAMPLE 2

The same operations as in Example 5 were repeated except that 1 millimole of cobalt acetylacetonate was used instead of cobalt octoate. The polymer product was obtained in a yield of 74% and had a melting point of 156°C, a content of 1,2-structure of 93.5% and a reduced specific viscosity of 0.73 ηsp/°C.

In Comparison Example 2, the same operations as above were repeated using no methyl alcohol. The comparative polymer product was obtained in a yield of 61.3% and had a melting point of 195°C, a content of 1,2-structure of 98.8% and a reduced specific viscosity of 0.85 ηsp/°C.

EXAMPLE 43

The same operations as in Example 5 were repeated except that cobalt octoate was used in an amount of 0.1 millimole instead of 1 millimole. The polymer product having a melting point of 159°C and a content of 1,2-structure of 92.7% was obtained in a yield of 84%.

EXAMPLE 44 AND COMPARISON EXAMPLE 3

The same procedures as in Example 5 were repeated except that the polymerization was carried out at a temperature of 5° instead of 30°C. The resultant polymer product was obtained in a yield of 51% and had a melting point of 162°C, a content of 1,2-structure of 93.0% and a reduced specific viscosity of 2.34 ηsp/°C.

In Comparison Example 3, the same operations as above were repeated using no methyl alcohol. The comparative polymer product was obtained in a yield of 22.4% and had a melting point of 203°C, a content of 1,2-structure of 98.7% and a reduced specific viscosity of 2.1 ηsp/°C.

EXAMPLES 45 THROUGH 49

In each of Examples 45 through 43, the following operations were carried out. In a 2,000 ml capacity glass separable flask from which the inside atmospheric air had been drawn out and replaced by nitrogen gas, 74 g of 1,3-butadiene was dissolved in 760 cc of dehydrated benzene. A portion of the benzene solution of 1,3-butadiene was withdrawn in the amount indicated in Table 3 from the 2,000 ml flask, and the withdrawn portion was mixed with about 10 ml of benzene received in a 1000 ml capacity glass separable flask in which the inside atmospheric air had been replaced by nitrogen gas. After the mixture was maintained in the flask for one minute, 0.25 millimoles of cobalt octoate in the state of a benzene solution containing 0.1 millimoles/ml of cobalt octoate was added to the solution in the 1,000 ml flask and, one minute after the above addition, 0.5 millimoles of triethylaluminum dissolved in benzene in a concentration of 1 millimole/ml, was added to the above mixture to prepare a catalyst component solution.

In order to prepare a polymerization mixture, 125 millimoles of methyl alcohol were added to the remaining solution in the 2,000 ml flask from which a portion of the benzene solution had been withdrawn, and one minute after the above addition, the content of the 1,000 ml flask was mixed with the content of the 2,000 ml flask and, one minute after the above mixing, 0.15 millimoles of carbon disulfide, which had been dissolved in benzene in a concentration of 0.3 millimoles/ml, were added to the mixture. The polymerization mixture was stirred at a temperature of 30°C for 60 minutes to polymerize 1,3-butadiene. In order to isolate the polymer product, the polymerization mixture was treated using the same method as in Example 1. The results are indicated in Table 3.

In Example 49, the same operations as in Example 45 were repeated except that methyl alcohol, cobalt octoate, triethylaluminum and carbon disulfide were respectively used in an amount of four times those in Example 45. The results are shown in Table 3.

Table 3

| Item Example No. | Polymerization Mixture (millimole) Catalyst Component Solution | | | | | Polymer Product | | |
|---|---|---|---|---|---|---|---|---|
| | Methyl alcohol | 1,3-butadiene | Cobalt Octoate | Triethyl aluminum | Carbon disulfide | Yield (%) | Content of 1,2-structure (%) | Melting point (°C) |
| 45 | 125 | 2 | 0.25 | 0.5 | 0.15 | 32 | 97.3 | 185 |
| 46 | 125 | 20 | 0.25 | 0.5 | 0.15 | 34 | 97.2 | 183 |
| 47 | 125 | 100 | 0.25 | 0.5 | 0.15 | 30 | 97.5 | 185 |
| 48 | 125 | 200 | 0.25 | 0.5 | 0.15 | 29 | 96.9 | 186 |
| 49 | 500 | 2 | 1 | 2 | 0.6 | 100 | 92.8 | 157 |

EXAMPLES 50 THROUGH 54

In each example, the same operations as in Example 49 were carried out again except that a catalyst component solution was prepared in a 1,000 ml flask, using a portion of the benzene solution containing 1,3-butadiene in an amount as indicated in Table 4. The catalyst component solution was mixed with 500 ml of methyl alcohol, and one minute after the mixing, the mixture was mixed with 0.6 millimoles of carbon disulfide which had been dissolved in benzene in a concentration of 0.3 millimoles/ml. Finally, the mixture thus prepared was added to the remaining benzene solution of 1,3-butadiene in the 2000 ml flask. The results are shown in Table 4.

Table 4

| Item Example No. | Polymerization Mixture (millimole) Catalyst Component Solution | | | | | Polymer Product | | |
|---|---|---|---|---|---|---|---|---|
| | 1,3-butadiene | Cobalt octoate | Triethyl aluminum | Methyl alcohol | Carbon disulfide | Yield (%) | Content of 1,2-structure (%) | Melting point (°C) |
| 50 | 20 | 1 | 2 | 500 | 0.6 | 50 | 93.4 | 162 |
| 51 | 100 | 1 | 2 | 500 | 0.6 | 51 | 93.1 | 162 |
| 52 | 200 | 1 | 2 | 500 | 0.6 | 62 | 91.9 | 160 |
| 53 | 500 | 1 | 2 | 500 | 0.6 | 82 | 92.4 | 160 |
| 54 | 1000 | 1 | 2 | 500 | 0.6 | 82 | 93.3 | 162 |

EXAMPLE 55

The same operations as in Example 49 were carried out again except that 500 millimoles of methyl alcohol, 0.6 millimoles of carbon disulfide and a catalyst component solution containing 20 millimoles of 1,3-butadiene were added, in the above-mentioned order, to the remaining benzene solution of 1,3-butadiene in a 2,000 ml flask. A polymer product was obtained in yield of 88% and had a melting point of 145°C and a content of 1,2-structure of 88%.

COMPARISON EXAMPLES 4 THROUGH 8

In each comparison example, a solution of 74 g of 1,3-butadiene in 760 ml of dehydrated benzene which is referred to as "solution M," a solution of 1 millimole of cobalt octoate in 10 ml of benzene which is referred to as "solution Co," a solution of 2 millimoles of triethylaluminum in 2 ml of benzene which is referred to as "solution Al," 500 millimoles of methyl alcohol which is referred to as "Alcohol" and a solution of 0.6 millimoles of carbon disulfide in 2 ml of benzene which is referred to as "solution $CS_2$," were separately prepared and mixed in the order as indicated in Table 5 at intervals of time of 1 minute to prepare a polymerization mixture. The polymerization mixture was agitated at a temperature of 30°C for 60 minutes. In each comparative example, no polymer product was obtained.

Table 5

| Item Comparison Example No. | Order of Mixing Catalyst Components | | | | |
|---|---|---|---|---|---|
| | 1 | 2 | 3 | 4 | 5 |
| 4 | M | Co | Alcohol | Al | $CS_2$ |
| 5 | M | $CS_2$ | Al | Alcohol | Co |
| 6 | Co | Al | $CS_2$ | Alcohol | M |
| 7 | Al | Alcohol | Co | $CS_2$ | M |
| 8 | Co | Al | Alcohol | $CS_2$ | M |

In the mixing orders as mentioned above, the catalyst component solution was not prepared. This resulted in no production of polymer.

EXAMPLES 56 THROUGH 64 AND COMPARISON EXAMPLE 9

In each example, the same operations as in Example 1 were repeated except that acetone in a quantity as indicated in Table 6 was used instead of methyl alcohol. The results are indicated in Table 6.

Table 6

| Item Example No. | Polymerization mixture Acetone (millimole) | Yield (%) | Content of 1,2-structure (%) | Melting Point (°C) | Reduced Specific Viscosity ($\eta$ sp/°C) |
|---|---|---|---|---|---|
| 56 | 10 | 71 | 99.3 | 192 | 0.95 |
| 57 | 40 | 64 | 98.0 | 191 | 0.98 |
| 58 | 120 | 58 | 96.8 | 183 | 0.85 |
| 59 | 500 | 93 | 93.6 | 158 | 0.87 |
| 60 | 1000 | 100 | 89.5 | 141 | 0.81 |
| 61 | 1500 | 100 | 89.1 | 135 | 0.97 |
| 62 | 2000 | 100 | 88.0 | 115 | 1.08 |
| 63 | 5000 | 100 | 83.8 | 97 | 1.31 |
| 64 | 10000 | 75 | 82.7 | 86 | 0.97 |

EXAMPLES 65 THROUGH 73

In each example, the same operations as in Example 59 were repeated except that a type of ketone compound as indicated in Table 7 was used instead of acetone. The results are indicated in Table 7.

Table 7

| Item Example No. | Polymerization mixture Type of Ketone | Yield (%) | Content of 1,2-structure (%) | Melting Point (°C) | Reduced Specific Viscosity ($\eta$ sp/°C) |
|---|---|---|---|---|---|
| 65 | Methylethyl ketone | 54 | 92.5 | 163 | 0.85 |
| 66 | Acetophenone | 93 | 94.9 | 165 | 1.01 |
| 67 | Acetylacetone | 30 | 98.9 | 188 | 0.81 |
| 68 | Methyl-isobutyl ketone | 56 | 98.4 | 177 | 0.90 |
| 69 | 2-Pentanone | 59 | 97.6 | 185 | 0.88 |
| 70 | Di-isobutyl ketone | 30 | 99.0 | 187 | 0.86 |
| 71 | 2-Hexanone | 92 | 90.0 | 164 | 1.12 |
| 72 | Benzophenone | 100 | 98.2 | 177 | 0.86 |
| 73 | Cyclohexanone | 100 | 94.0 | 137 | 0.89 |

EXAMPLES 74 THROUGH 75

The same procedures as in Example 59 were repeated twice using, in place of cobalt octoate, cobalt acetylacetonate (Example 74) and cobalt dichloride-dipyridine complex (Example 75). The results are indicated in Table 8.

Table 8

| Item Example | Polymer Product | | | |
|---|---|---|---|---|
| | Yield (%) | Content of 1,2-structure (%) | Melting Point (°C) | Reduced Specific Viscosity ($\eta$sp/°C) |
| 74 | 47 | 93.4 | 156 | 0.73 |
| 75 | 50 | 93.0 | 162 | 1.03 |

EXAMPLES 76 AND 77

In Example 76, the same procedures as in Example 59 were repeated except that the preparation of a polymerization mixture was carried out by the following method. The air in 2,000 ml capacity glass separable flask was sucked out and the flask was filled with nitrogen gas. In the flask, 74 g of 1,3-butadiene was dissolved in 760 ml of dehydrated benzene. A portion of the benzene solution containing 20 millimoles of 1,3-butadiene was withdrawn from the 2,000 ml flask and mixed with about 10 ml of benzene in a 1,000 ml capacity glass flask from which the inside atmospheric air had been drawn out and replaced with nitrogen gas. The mixture was maintained in the flask for 1 minute and, thereafter, mixed with 1 millimole of cobalt octoate which was in the state of a benzene solution having a concentration of 0.1 millimoles/ml and, then, 2 millimoles of triethyl-aluminum which was in the state of a benzene solution of a concentration of 1 millimole/ml, at an interval of time of 1 minute. A catalyst component solution was obtained. Acetone in an amount of 500 millimoles was mixed with the remaining benzene solution of 1,3-butadiene in the 2,000 ml flask and, at an interval of time of 1 minute, the above mixture was further mixed with 0.6 millimoles of carbon disulfide in the state of a benzene solution having a carbon disulfide polymer products of the examples had properties as indicated in Table 11.

Table 11

| Item Example No. | Polymerization Mixture Type of Aldehyde Compound | Yield (%) | Polymer Product Content of 1,2-structure (%) | Melting Point (°C) | Reduced Specific Viscosity (η sp/°C) |
|---|---|---|---|---|---|
| 85 | Formaldehyde | 20 | 95.0 | 180 | 0.85 |
| 86 | Acetaldehyde | 30 | 92.7 | 169 | 0.97 |
| 87 | Benzaldehyde | 50 | 84.7 | 149 | 0.90 |
| 88 | n-Butylaldehyde | 100 | 87.5 | 155 | 0.88 |
| 89 | Furfural | 80 | 93.6 | 142 | 0.98 |
| 90 | n-Dedecylaldehyde | 50 | 91.5 | 161 | 0.95 | fide concentration of 0.3 millimoles/ml. The polymerization mixture thus prepared was stirred at a temperature of 30°C for 60 minutes to allow 1,3-butadiene to polymerize. The results are indicated in Table 9.

In Example 77, the same procedure as in Example 76 were carried out again except that the same catalyst component solution as in Example 76 was mixed with 500 millimoles of acetone and, at an interval of time of 1 minute, 0.6 millimoles of carbon disulfide in the state of a 0.3 millimole/ml concentration benzene solution to prepare a catalyst composition, and the catalyst composition was added to the remaining benzene solution of 1,3-butadiene in the 2,000 ml flask, to prepare a polymerization mixture. The results are shown in Table 9.

Table 9

| Item Example | Order of Mixing catalyst components 1 | 2 | 3 | 4 | Yield (%) | Polymer Product Content of 1,2-structure (%) | Melting Point (°C) |
|---|---|---|---|---|---|---|---|
| 76 | M | Acetone | B | CS₂ | 81 | 93.0 | 157 |
| 77 | B | Acetone | CS₂ | M | 60 | 92.5 | 156 |

In the above table, M represents the remaining benzene solution of 1,3-structure, B the catalyst component solution and CS₂ the carbon disulfide.

EXAMPLES 78 THROUGH 84

In each example, the same operations as in Example 59 were repeated except that p-anisaldehyde in an amount as indicated in Table 10 was used in place of 500 millimoles of acetone. The results are shown in Table 10.

Table 10

| Item Example No. | Polymerization Mixture Amount of p-Anisaldehyde | Yield (%) | Polymer Product Content of 1,2-structure (%) | Melting Point (°C) | Reduced Specific Viscosity (η sp/°C) |
|---|---|---|---|---|---|
| 78 | 80 | 85 | 95.0 | 169 | 1.08 |
| 79 | 200 | 100 | 94.5 | 139 | 0.95 |
| 80 | 500 | 100 | 89.6 | 97 | 1.32 |
| 81 | 1000 | 100 | 85.5 | 95 | 1.25 |
| 82 | 3800 | 55 | 80.0 | 93 | 1.53 |
| 83 | 5000 | 30 | 80.0 | 93 | 1.41 |
| 84 | 10000 | 20 | 78.0 | 90 | 1.37 |

EXAMPLES 85 THROUGH 90

In each example, the same operations as in Example 80 were repeated using a type of aldehyde compound as indicated in Table 11 in place of p-anisaldehyde. The In Example 85, formaldehyde used was in the state of an aqueous solution containing 37% by weight of formaldehyde.

EXAMPLE 91

The same operations as in Example 76 were repeated except that 10,000 millimoles of cyclohexanone were used instead of 500 millimoles of acetone. A polymer product was obtained in a yield of 97% and had a content of 1,2-structure of 75.0% and a melting point of 74°C.

EXAMPLE 92

The same procedures as in Example 76 were repeated except that 5,000 millimoles of p-anisaldehyde were used for 500 millimoles of acetone. A polymer product was obtained in a yield of 40% and had a melting point of 94°C.

EXAMPLES 93 THROUGH 96

In each example, the same procedures as in Example 56 were carried out except that the polymerization mixture was prepared by the following method. 74 g of 1,3-butadiene was dissolved in 760 ml of dehydrated benzene received in a 2,000 ml capacity glass separable flask from which the inside atmospheric air had been withdrawn and replaced by nitrogen gas. Into the solution prepared as stated above, triethylaluminum in the state of a benzene solution of a concentration of 1 millimole/ml was added in an amount as indicated in Table 12.

Thereafter, at an interval of time of 1 minute, 1 millimole of cobalt octoate, in the state of a benzene solution of a 0.1 millimole/ml concentration, was added to the mixture to prepare a catalyst component solution.

One minute after completion of the preparation stated above, instead of 10 millimoles of acetone, 500 millimoles of a ketone or aldehyde compound as indicated in Table 12 were mixed with the catalyst component solution and, at an interval of time of one minute, 0.6 millimoles of carbon disulfide in the state of a benzene solution having a concentration of 0.3 millimoles/ml was added to the above mixture.

The resultant polymer products had the properties as indicated in Table 12.

Table 12

| Item Example No. | Polymerization Mixture Amount of Triethylaluminum (millimole) | Type of Ketone or Aldehyde | Yield (%) | Polymer Product Content of 1,2-structure (%) | Melting Point (°C) | Reduced Specific Viscosity ($\eta sp/°C$) |
|---|---|---|---|---|---|---|
| 93 | 1.0 | Acetone | 25 | 92 | 157 | 0.87 |
| 94 | 1.5 | Acetone | 77 | 92 | 157 | 0.82 |
| 95 | 1.0 | p-Anisaldehyde | 54 | 92 | 155 | 1.17 |
| 96 | 1.5 | p-Anisaldehyde | 100 | 91 | 150 | 1.24 |

COMPARISON EXAMPLES 9 THROUGH 13

In each comparison example, the same solution M, Co, Al and $CS_2$ as in Comparison Example 4 were separately prepared and, then the solution M, Co, Al and $CS_2$ and 500 millimoles of acetone were mixed in the sequence as indicated in Table 13, at intervals of time of 1 minute, to prepare a polymerization mixture. The mixture was stirred at a temperature of 30°C for 60 minutes. It was observed that no polymer product was produced.

Table 13

| Item Comparison Example No. | Order of Mixing Catalyst Components | | | | |
|---|---|---|---|---|---|
| | 1 | 2 | 3 | 4 | 5 |
| 9 | M | Co | Acetone | Al | $CS_2$ |
| 10 | M | $CS_2$ | Al | Acetone | Co |
| 11 | Co | Al | $CS_2$ | Acetone | M |
| 12 | Al | Acetone | Co | $CS_2$ | M |
| 13 | Co | Al | Acetone | $CS_2$ | M |

EXAMPLES 97 THROUGH 105 AND COMPARISON EXAMPLE 15.

In each of the Examples 97 through 105, a polymerization mixture was prepared by the following procedures. In a 2,000 ml capacity glass separable flask, from which the inside atmospheric air had been drawn out and replaced by nitrogen gas, 74 g of 1,3-butadiene was dissolved in 760 ml of dehydrated benzene containing 1.0 millimole of water, and 3 millimoles of triethylaluminum were mixed to the solution. The mixture was maintained for 1 minute while stirring. The triethylaluminum charged above was in the state of a benzene solution containing 0.1 millimole/ml of triethylaluminum. Thereafter, 1 millimole of cobalt octoate in the state of a benzene solution containing 0.1 millimole/ml of the cobalt octoate was further mixed to the mixture in the 2,000 ml flask and the mixture thus prepared was stirred for 1 minute to provide a catalyst component solution. Thereafter, methyl alcohol in an amount as indicated in Table 14 was mixed with the catalyst component solution in the 2,000 ml flask and the mixture was stirred for 1 minute. After that, 0.6 millimoles of carbon disulfide in the state of a benzene solution containing 0.3 millimoles/ml of carbon disulfide, was charged into the flask and the polymerization mixture thus prepared was stirred at a temperature of 30°C for 60 minutes to allow 1,3-butadiene to polymerize. Thereafter, the polymerization mixture was added to a 1,000 ml of methyl alcohol solution containing 0.74 g of phenyl-$\beta$-naphthylamine and 7.5 g of a 30% sulfuric acid aqueous solution, to separate and deposit the polymeric product from the mixture. The polymeric product was washed with methyl alcohol and dried at room temperature. The dried polymer product was entirely in the form of powder. Table 14 indicates the yields of the polymeric product, content of 1,2-structure in the polymeric product as well as the melting point and reduced specific viscosity of the polymeric product.

Table 14

| Item Example No. | Amount of methyl alcohol added (millimole) | Yield of polymer (% by weight) | Content of 1,2-structure (%) | Melting Point (°C) | Reduced Specific Viscosity ($\eta sp/°C$) |
|---|---|---|---|---|---|
| 97 | 10 | 71 | 98.7 | 193 | 0.97 |
| 98 | 40 | 74 | 98.0 | 190 | 0.95 |
| 99 | 120 | 77 | 98.2 | 185 | 0.80 |
| 100 | 500 | 84 | 94.0 | 167 | 0.84 |
| 101 | 1,000 | 98 | 91.7 | 141 | 0.92 |
| 102 | 1,500 | 99 | 89.4 | 129 | 0.85 |
| 103 | 2,000 | 80 | 87.6 | 120 | 0.93 |
| 104 | 5,000 | 52 | 85.3 | 109 | 1.07 |
| 105 | 10,000 | 15 | 84.9 | 108 | 1.05 |

EXAMPLES 106 THROUGH 122

In each of the Examples 106 through 122, the same operations as in Example 100 were repeated using, instead of methyl alcohol, an alcohol indicated in Table 15. The results are shown in Table 15.

Table 15

| Item Example No. | Type of Alcohol added | Yield of polymer (%) | Content of 1,2-structure (%) | Melting Point (°C) | Reduced Specific Viscosity ($\eta sp/°C$) |
|---|---|---|---|---|---|
| 106 | Ethyl alcohol | 75 | 88.6 | 169 | 0.91 |
| 107 | n-Propyl alcohol | 86 | 94.2 | 172 | 0.82 |
| 108 | n-Butyl alcohol | 55 | 90.8 | 174 | 1.00 |
| 109 | Iso-butyl alcohol | 41 | 94.6 | 176 | 0.97 |

Table 15—continued

| Item Example No. | Type of Alcohol added | Yield of polymer (%) | Content of 1,2-structure (%) | Melting Point (°C) | Reduced Specific Viscosity (ηsp/°C) |
|---|---|---|---|---|---|
| 110 | n-Amyl alcohol | 77 | 94.8 | 175 | 0.92 |
| 111 | n-Hexyl alcohol | 53 | 92.4 | 172 | 0.83 |
| 112 | n-Heptyl alcohol | 48 | 94.9 | 177 | 0.84 |
| 113 | 2-Octyl alcohol | 81 | 95.2 | 182 | 0.83 |
| 114 | n-Decyl alcohol | 52 | 96.3 | 174 | 0.86 |
| 115 | Lauryl alcohol | 63 | 93.7 | 165 | 0.87 |
| 116 | Allyl alcohol | 78 | 96.4 | 179 | 0.83 |
| 117 | Benzyl alcohol | 84 | 94.8 | 175 | 0.84 |
| 118 | Triphenyl carbinol | 53 | 93.8 | 159 | 0.90 |
| 119 | Furfuryl alcohol | 51 | 96.7 | 186 | 0.88 |
| 120 | Triethylene glycol | 85 | 89.5 | 166 | 1.08 |
| 121 | 1,6-Hexane-diol | 82 | 97.8 | 184 | 0.85 |
| 122 | Glycerine | 65 | 97.6 | 187 | 0.91 |

EXAMPLE 123 AND COMPARISON EXAMPLE 16

The same operations as in Example 100 were repeated except that 1 millimole of cobalt acetylacetonate was used instead of cobalt octoate. The resultant polybutadiene had a yield of 72%, a content of 1,2-structure of 92.7%, a melting point of 155°C and a reduced specific viscosity of 0.78 ηsp/°C.

In Comparison Example 14, the same procedures as above were repeated except that no methyl alcohol was added. The resultant comparative polybutadiene had a yield of 58%, a content of 1,2-polybutadiene of 99.1%, a melting point of 196°C and a reduced specific viscosity of 0.83 ηsp/°C.

EXAMPLES 124 THROUGH 137

In each of the Examples 124 through 137, the same procedures as in Example 100 were carried out by using cobalt octoate and triethylaluminum in amounts indicated in Table 16. The results are indicated in Table 16.

Table 16

| Item Example No. | Amount of cobalt octoate added (millimole) | Amount of triethylaluminum added (millimole) | Yield of polybutadiene (%) | Content of 1,2-structure (%) | Melting Point (°C) | Reduced Specific Viscosity (ηsp/°C) |
|---|---|---|---|---|---|---|
| 124 | 6.0 | 3.0 | 38 | 90.7 | 156 | 0.85 |
| 125 | 3.0 | 3.0 | 65 | 92.8 | 160 | 0.89 |
| 126 | 6.0 | 6.0 | 84 | 91.4 | 157 | 0.97 |
| 127 | 3.0 | 6.0 | 81 | 91.5 | 158 | 0.95 |
| 128 | 6.0 | 12.0 | 35 | 91.9 | 160 | 1.01 |
| 129 | 3.0 | 9.0 | 63 | 92.3 | 162 | 0.93 |
| 130 | 6.0 | 18.0 | 35 | 90.8 | 157 | 1.02 |
| 131 | 1.0 | 4.0 | 82 | 93.9 | 170 | 0.78 |
| 132 | 3.0 | 12.0 | 58 | 91.7 | 162 | 0.92 |
| 133 | 6.0 | 24.0 | 35 | 91.3 | 162 | 0.98 |
| 134 | 0.2 | 2.0 | 50 | 92.2 | 159 | 0.94 |
| 135 | 0.1 | 2.0 | 20 | 91.8 | 161 | 0.99 |
| 136 | 0.1 | 4.0 | 19 | 92.4 | 161 | 1.02 |
| 137 | 6.0 | 24.0 | 48 | 94.1 | 163 | 1.15 |

EXAMPLES 138 THROUGH 141.

In each of the Examples 138 through 141, the following procedures were carried out. A 2,000 ml capacity glass separable flask, from which the inside atmospheric air had been withdrawn and replaced by nitrogen gas was charged with 760 ml of dehydrated benzene (containing 1.0 millimole of water) and 74 g of 1,3-butadiene to dissolve the 1,3-butadiene. The benzene solution containing 1,3-butadiene in the amount indicated in Table 17 was withdrawn from the 2,000 ml flask and mixed with approximately 10 ml of benzene contained in a 1,000 ml capacity glass separable flask, from which the inside atmospheric air had been withdrawn and replaced by nitrogen gas, and the solution was maintained in the flask for 1 minute. Thereafter, 3 millimoles of triethylaluminum in the state of a benzene solution containing 1 millimole/ml of triethlaluminum was added to the 1,000 ml flask and one minute after the above addition, 1 millimole of cobalt octoate in the state of a benzene solution containing 0.1 millimoles/ml of cobalt octoate was added to the 1,000 ml flask.

The resultant liquid was a catalyst component solution. The remainder in the 2,000 ml flask was mixed, within the 2,000 ml flask, with 500 millimoles of methyl alcohol. The mixture thus prepared was mixed with the catalyst component solution and one minute after completion of the mixing, 0.6 millimoles of carbon disulfide in the state of a benzene solution containing 0.3 millimoles/ml of carbon disulfide were added to the mixture. The polymerization mixture thus prepared was stirred at a temperature of 30°C for 60 minutes to permit 1,3-butadiene to polymerize. The resultant polybutadiene was treated by the same method as in Example 1. Table 17 indicates properties of the polybutadienes in the present examples.

Table 17

| Item Example No. | Catalyst component solution - Amount of components (millimole) | | | Yield (%) | Polymer Content of 1,2-structure (%) | Melting point (°C) |
|---|---|---|---|---|---|---|
| | 1,3-butadiene | Triethyl-aluminum | Cobalt octoate | | | |
| 138 | 2 | 3 | 1 | 75 | 94.4 | 163 |
| 139 | 20 | 3 | 1 | 80 | 92.5 | 160 |
| 140 | 100 | 3 | 1 | 85 | 91.5 | 161 |
| 141 | 200 | 3 | 1 | 87 | 92.7 | 162 |

EXAMPLES 142 THROUGH 146

In each Example, the same operations as in Example 138 were carried out except that a catalyst component solution of a composition indicated in Table 18 was prepared, 500 millimoles of methyl alcohol were mixed with the catalyst component solution and, 1 minute after the above mixing, 0.6 millimoles of carbon disulfide in the state of a benzene solution containing 0.3 millimoles/ml of carbon disulfide were added to the above mixture in order to prepare a catalyst composition. The catalyst composition was mixed with the remainder of the solution in the 2,000 ml flask.

The results are shown in Table 18.

Table 18

| Item Example No. | Catalyst component solution - Amount of components (millimole) | | | Yield (%) | Polymer Content of 1,2-structure (%) | Melting point (°C) |
|---|---|---|---|---|---|---|
| | 1,3-butadiene | Triethyl-aluminum | Cobalt octoate | | | |
| 142 | 20 | 3 | 1 | 47 | 93.8 | 164 |
| 143 | 100 | 3 | 1 | 52 | 93.5 | 165 |
| 144 | 200 | 3 | 1 | 71 | 92.6 | 163 |
| 145 | 500 | 3 | 1 | 80 | 91.1 | 162 |
| 146 | 1000 | 3 | 1 | 79 | 92.9 | 164 |

EXAMPLE 147

The same operation as in Example 139 were repeated except that 500 millimoles of methyl alcohol and 0.6 millimoles of carbon disulfide and a catalyst component solution containing 20 millimoles of 1,3-butadiene, 3 millimoles of triethylaluminum and 1 millimole of cobalt octoate, were separately charged into the 2,000 ml flask containing the benzene solution of 1,3-butadiene at an interval of time of 1 minute.

A polymer product was obtained at a yield of 76% and had a melting point of 152°C and a content of 1,2-structure of 89.6%.

EXAMPLE 148

The same procedures as in Example 100 were repeated except that 760 cc of a dehydrated benzene containing 0.4 millimoles of water was used. The polymer product was obtained at a yield of 66% and had a melting point of 158°C and a content of 1,2-structure of 90.4%.

COMPARISON EXAMPLES 15 AND 16

The same operations as in Example 148 were repeated twice using 760 ml of a dehydrated benzene containing 3.0 millimoles of water (Comparison Example 17) and 760 ml of a dehydrated benzene containing 4.8 millimoles of water (Comparison Example 18). No polymer was produced in either of these comparison examples.

COMPARISON EXAMPLES 17 THROUGH 23

In each of the comparison Examples 17 through 23, the same operations as in Example 100 were repeated using triethylaluminum and cobalt octoate in amounts indicated in Table 19. The 760 ml dehydrated benzene contained 1 millimole of water.

Table 19

| Item Comparison Example No. | Amount (millimole) | |
|---|---|---|
| | Cobalt octoate | Triethylaluminum |
| 17 | 3 | 0.9 |
| 18 | 6 | 1.8 |
| 19 | 1 | 1 |
| 20 | 1 | 2 |
| 21 | 0.2 | 0.6 |
| 22 | 0.1 | 0.4 |
| 23 | 0.2 | 0.8 |

No polymer was produced in any of these comparison examples.

What we claim is:

1. A process for producing a butadiene polymer composed essentially of 1,2-structure, comprising the steps of:
   A. preparing a catalyst component solution by dissolving, in an inert organic solvent containing 1,3-butadiene, (a) at least one cobalt compound selected from the group consisting of (i) β-diketone complexes of cobalt, (ii) β-keto-acid ester complexes of cobalt, (iii) cobalt salts of organic carboxylic acids having 6 to 15 carbon atoms, and (iv) complexes of halogenated cobalt compounds of the formula CoXn, wherein X represents a halogen atom and n represents 2 or 3, with an organic compound selected from the group consisting of tertiary amines alcohols, tertiary phosphines, ketones and N,N-dialkyl-amides, and (b) at least one organoaluminum compound of the formula AlR₃, wherein R represents a hydrocarbon radical of 1 to 6 carbon atoms;

B. preparing a catalyst composition by mixing said catalyst component solution with (c) at least one organic compound selected from the group consisting of alcohol compounds having 1 to 25 carbon atoms, ketone compounds having 3 to 20 carbon atoms and aldehyde compounds having 1 to 20 carbon atoms and (d) carbon disulfide;

C. providing a polymerization mixture containing desired amounts of 1,3-butadiene, said catalyst composition and an inert organic solvent, and;

D. polymerizing said 1,3-butadiene in said polymerization mixture at a temperature of −20° to 80°C.

2. A process as claimed in claim 1, wherein said catalyst component solution is prepared by firstly dissolving said cobalt compound into said inert organic solvent containing 1,3-butadiene and secondly dissolving said organoaluminum compound into the above solution.

3. A process as claimed in claim 1, wherein said catalyst composition contains 0.0005 to 1.0% by mole of said cobalt compound, 0.001 to 10% by mole of said organoaluminum compound, 0.5 to 5,000% by mole of said alcohol, ketone or aldehyde and 0.0005 to 2% by mole of said carbon disulfide, based on the amount by mole of said 1,3-butadiene in said polymerization mixture.

4. A process as claimed in claim 3, wherein said cobalt compound is in an amount of 0.001 to 0.5% by mole, said organoaluminum compound in 0.03 to 5% by mole, said alcohol, ketone or aldehyde in 1 to 1,000% by mole and said carbon disulfide in 0.001 to 1% by mole, based on the amount by mole of said 1,3-butadiene.

5. A process as claimed in claim 1, wherein said catalyst component solution is prepared at a temperature of 10° to 50°C.

6. A process as claimed in claim 1, wherein said catalyst component solution is prepared by using an inert organic solvent containing at least 100% by mole of 1,3-butadiene based on the amount by mole of said cobalt compound.

7. A process as claimed in claim 6, wherein the amount of said 1,3-butadiene is at least 500% by mole based on the amount by mole of said cobalt compound.

8. A process as claimed in claim 1, wherein the ratio by mole of the amount of said organoaluminum compound to said cobalt compound is in a range from 0.1 to 500.

9. A process as claimed in claim 8, wherein said ratio by mole of the amount of said organoaluminum compound to said cobalt compound is from 0.5 to 100.

10. A process as claimed in claim 1, wherein said catalyst composition is prepared at a temperature of 10° to 50°C.

11. A process as claimed in claim 1, wherein the ratio by mole of the amount of said alcohol, ketone or aldehyde compound to said organoaluminum compound is in a range from 5 to 25,000.

12. A process as claimed in claim 11, wherein the ratio by mole of the amount of said alcohol, ketone or aldehyde compound to said organoaluminum compound is from 10 to 5,000.

13. A process as claimed in claim 1, wherein said polymerization temperature is from 5° to 50°C.

14. A process as claimed in claim 1, wherein said 1,3-butadiene to be polymerized is in an amount of 2 to 30% based on said inert organic solvent in said polymerization mixture.

15. A process as claimed in claim 1, wherein said catalyst composition further contains water in a ratio by mole of 0.01 to 5,000 to the amount by mole of said cobalt compound.

16. A process as claimed in claim 1, wherein said catalyst component solution is prepared by firstly dissolving said organoaluminum compound in said inert organic solvent containing 1,3-butadiene and secondly dissolving said cobalt compound in the above-prepared solution, and said catalyst component solution contains water, said organoaluminum compound and said cobalt compound in a ratio by mole percentage of $a : b : c$, said proportion $a$, $b$ and $c$ being on or within a figure defined, in a triangular coordinate system having three ordinates respectively presenting the mole percentages of said water, organoaluminum compound and cobalt compound, by coordinates A ($a = 49.8$, $b = 50$ and $c = 0.2$), B ($a = 0$, $b = 99.8$ and $c = 0.2$), C ($a = 0$, $b = 25$ and $c = 75$), D ($a = 20$, $b = 25$ and $c = 55$) and E ($a = 20$, $b = 55$ and $c = 25$).

17. A process as claimed in claim 16, wherein said inert organic solvent contains no or at most 500 p.p.m. of water based on the weight of said inert organic solvent.

18. A process as claimed in claim 17, wherein said amount of water is at most 200 p.p.m. based on the weight of said inert organic solvent.

19. A process as claimed in claim 1, wherein said inert organic solvent is selected from the group consisting of aromatic hydrocarbons, aliphatic hydrocarbons, alicyclic hydrocarbons, halogenated aromatic hydrocarbons, halogenated aliphatic hydrocarbons, halogenated alicyclic hydrocarbons, and mixtures of two or more of the above-mentioned compounds.

20. A process as claimed in claim 19, wherein said polymerization mixture further contains the same inert organic solvent as that used in said catalyst component solution.

21. A process as claimed in claim 1, wherein said β-diketone complex of cobalt has a diketone group of the formula:

wherein $R^1$ and $R^4$, which are the same as or different from one another, are each an alkyl radical of 1 to 6 carbon atoms and $R^2$ and $R^3$, which are the same as or different from one another, are each a hydrogen atom or an alkyl radical having 1 to 6 carbon atoms.

22. A process as claimed in claim 1, wherein said β-diketone complex of cobalt is either cobalt (II) acetylacetonate or cobalt (III) acetylacetonate.

23. A process as claimed in claim 1, wherein said β-keto-acid ester complex of cobalt has a β-keto-acid ester group of the formula:

wherein R¹, R², R³ and R⁴ are the same as defined above.

24. A process as claimed in claim 1, wherein said β-keto-acid ester complex of cobalt is a cobalt-acetacetic acid ethyl ester complex.

25. A process as claimed in claim 1, wherein said cobalt salt is either cobalt octoate or cobalt naphthenate.

26. A process as claimed in claim 1, wherein said complex of halogenated cobalt compound is either a complex of cobalt chloride with pyridine or ethyl alcohol.

27. A process as claimed in claim 1, said organoaluminum compound is selected from the group consisting of trimethylaluminum, triethylaluminum, tributylaluminum and triphenylaluminum.

28. A process as claimed in claim 1, wherein said alcohol is selected from the group consisting of monohydric alcohols, polyhydric alcohols and polyhydric alcohol derivatives having at least one hydroxyl radical.

29. A process as claimed in claim 28, wherein said monohydric alcohol is selected from the group consisting of saturated aliphatic alcohols, unsaturated aliphatic alcohols, alicyclic alcohols, aromatic alcohols and heterocyclic alcohols.

30. A process as claimed in claim 29, wherein said saturated aliphatic alcohol is selected from the group consisting of methyl alcohol, ethyl alcohol, n-propyl alcohol, isopropyl alcohol, n-butyl alcohol, sec-butyl alcohol, tertbutyl alcohol, isobutyl alcohol, n-amyl alcohol, isoamyl alcohol, sec-amyl alcohol, tert-amyl alcohol, n-hexyl alcohol, 2-ethylbutyl alcohol, n-heptyl alcohol, 2-heptyl alcohol, n-octyl alcohol, 2-octyl alcohol, 2-ethylhexyl alcohol, capryl alcohol, nonyl alcohol, n-decyl alcohol, lauryl alcohol and 4-methylpentanol-2.

31. A process as claimed in claim 29, wherein said unsaturated aliphatic alcohol is selected from the group consisting of allyl alcohol, crotyl alcohol and propargyl alcohol.

32. A process as claimed in claim 29, wherein said alicyclic alcohol is selected from the group consisting of cyclopentanol, cyclohexanol, 2-methylcyclohexanol and α-terpineol.

33. A process as claimed in claim 29, wherein said aromatic alcohol is selected from the group consisting of benzyl alcohol, cinnamyl alcohol and triphenyl carbinol.

34. A process as claimed in claim 29, wherein said heterocyclic alcohol is either furfuryl alcohol or tetrahydrofurfuryl alcohol.

35. A process as claimed in claim 28, wherein said polyhydric alcohol is selected from ethylene glycol, propylene glycol, 1,3-butane diol, 1,5-pentane diol, 1,6-hexane diol, 1,10-decane diol, glycerin, 1,1,1-trishydroxypropane, 1,2,6-hexane triol, pentaerythritol and trimethylol propane.

36. A process as claimed in claim 28, wherein said polyhydric alcohol derivative is selected from the group consisting of ethylene glycol monoalkyl ether, diethylene glycol, diethylene glycol monoalkyl ether, triethylene glycol, triethylene glycol monoalkyl ether, propylene glycol monoalkyl ether and diacetone alcohol.

37. A process as claimed in claim 1, wherein said ketone compound is selected from the group consisting of aliphatic ketones, alicyclic ketones, aromatic ketones and heterocyclic ketones.

38. A process as claimed in claim 37, wherein said aliphatic ketone is selected from the group consisting of acetone, acetylacetone, ethylmethyl ketone, methylpropyl ketone, iso-propylmethyl ketone, butylmethyl ketone, isobutylmethyl ketone, pinacolone, diethyl ketone, butyrone, di-isopropyl ketone and di-isobutyl ketone.

39. A process as claimed in claim 37, wherein said alicyclic ketone is selected from the group consisting of cyclobutanone, cyclopentanone, cyclohexanone and cyclododecanone.

40. A process as claimed in claim 37, wherein said aromatic ketone is selected from the group consisting of acetophenone, propiophenone, butylophenone, valerophenone, benzophenone, dibenzyl ketone and 2-aceto-naphthone.

41. A process as claimed in claim 39, wherein said heterocyclic ketone is either 3-acetothienone or 2-acetofuron.

42. A process as claimed in claim 1, wherein said aldehyde compound is selected from the group consisting of aliphatic aldehydes, aliphatic dialdehydes, aromatic aldehydes, heterocyclic aldehydes.

43. A process as claimed in claim 42, wherein said aliphatic aldehyde is selected from the group consisting of formaldehyde, acetaldehyde, propionaldehyde, n-butyl aldehyde, isobutyl aldehyde, n-valeraldehyde, isovaleraldehyde, pivalic aldehyde, caproic aldehyde, heptaldehyde, caprylic aldehyde, pelargonaldehyde, capric aldehyde, undecyl aldehyde, lauric aldehyde, tridecyl aldehyde, mystic aldehyde, pentadecylaldehyde, palmitic aldehyde and stearic aldehyde.

44. A process as claimed in claim 42, wherein said aliphatic dialdehyde is either glyoxal or succindialdehyde.

45. A process as claimed in claim 42, wherein said aromatic aldehyde is selected from the group consisting of benzaldehyde, o-, m- and p-tolualdehydes, salicyl aldehyde, α- and β-naphthoaldehydes and o-, m- and p-anisaldehydes.

46. A process as claimed in claim 42, wherein said heterocyclic aldehyde is furfural.

* * * * *